3,528,897
PHOTOLYSIS OF TETRAZOLES AND
TETRAZOLIDES
Peter Scheiner, Princeton, N.J., assignor to Mobil Oil
Corporation, a corporation of New York
No Drawing. Filed Dec. 7, 1967, Ser. No. 688,690
Int. Cl. B01j 1/10
U.S. Cl. 204—158          21 Claims

ABSTRACT OF THE DISCLOSURE

A tetrazole is subjected to specified electromagnetic radiation to photolyze the same to nitrogen gas and a reactive 1,3-dipolar intermediate, and the intermediate is converted into a ring compound. A tetrazole can be converted to a tetrazolide and the latter can then be subjected to the radiation.

BACKGROUND OF THE INVENTION (1) The field of the invention comprises the photolysis of tetrazoles and tetrazolides.

(2) While the thermal decomposition of various tetrazoles has been reported, the photolysis of these compounds has not, so far as is known, been described. The photolytic reactions of tetrazolides are also believed to be new.

SUMMARY OF THE INVENTION

Useful organic compounds are prepared photochemically by subjecting tetrazoles or tetrazolides to ultraviolet radiation, preferably in the presence of an unsaturated non-aromatic compound. The photolysis of the tetrazole or tetrazolide leads to a reactive intermediate, and the non-aromatic compound is capable of taking part in an addition reaction involving such intermediate, leading to various organic compounds of interest. The described photochemical reaction is performable at low temperatures and in the substantial absence of side reactions; and owing to the variety of the reactants that may take part therein, is capable of producing a broad array of products. Some of these products are of value as light stabilizers for light-unstable materials; for example, certain lubricating oil fractions may be improved in respect of their resistance to light and air. Other products may act as optical brighteners.

DESCRIPTION OF THE SPECIFIC EMBODIMENTS

Any suitable tetrazole may be photolyzed, including tetrazole itself and substituted tetrazoles. Referring to tetrazole, two tautomeric structures are known:

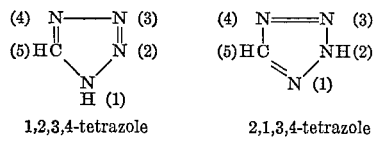

1,2,3,4-tetrazole          2,1,3,4-tetrazole

In 1,2,3,4-tetrazole, substitution is possible at the 1 and 5 positions, and in 2,1,3,4-tetrazole at the 2 and 5 positions. For purposes of the invention, the preferred substituting groups are hydrogen, alkyl, aryl, substituted alkyl, and substituted aryl, although any other suitable group is acceptable, including acyl, acyloxy, amino, amido, aryloxy, alkoxy, carbalkoxy, cycloalkyl, halogen, hydroxy, cyanide, keto, mercapto, nitrate, nitro, sulfide, sulfonyl, vinyl, trialkylsilyl, etc. One or two of these groups, either the same or different, may be present in the tetrazole, and will be present in the resulting product. For convenience, the term "hydrocarbyl" group may be used to designate any group containing only carbon and hydrogen, such as alkyl, aryl, alkenyl, alkynyl, alkaryl, aralkyl, etc.; and the term "organyl" may be used to designate hydrocarbyl groups, substituted hydrocarbyl groups, and heterocyclic groups.

Suitable specific illustrative substituted tetrazoles include the following (the numbering of the N atoms in the tetrazole ring are omitted for convenience):

1-methyl- and 2-methyltetrazoles
1-ethyltetrazole
1-, 2-, and 5-phenyltetrazoles
1- and 5-hydroxytetrazoles
5-methyl-1-phenyltetrazole
1,5-diphenyltetrazole
2,5-diphenyltetrazole
1,5-pentamethylenetetrazole
5-hydroxy-1-phenyltetrazole
5-methylthiotetrazole
5-methylsulfonyltetrazole
5-aminotetrazole
5-chlorotetrazole
5-para-anisyltetrazole
5-(1-phenanthryl)-1-phenyltetrazole
1, and 2-naphthyltetrazoles
1,5-di-beta-naphthyltetrazole The tetrazole compound is preferably in the liquid phase during irradiation. If it is not normally a liquid compound, it may be heated above its melting point to liquefy the same; or, as is preferable, it is dissolved in a suitable solvent. If the compound is heated, it is desirable to select compounds of low melting point to avoid thermal reactions. As to the solvent, it may be inert with respect to the tetrazole photolysis product, or it may be reactive therewith; in the latter case the solvent comprises the above-noted unsaturated non-aromatic compound. Whether inert or reactive, the solvent should not react with the starting tetrazole.

Where the solvent is inert, it is found that the tetrazole undergoes dimerization. The following equation, involving photolysis of 5-phenyltetrazole (I), may illustrate this reaction:

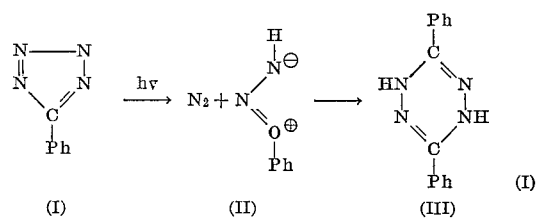

Under the influence of the radiation, the starting tetrazole (I) is converted to a reactive 1,3-dipolar intermediate, believed to be represented by (II), which dimerizes to form (III), namely, 3,6-diphenyl-dihydro-1,2,4,5-tetrazine. The latter may undergo oxidation to 3,6-diphenyl-1,2,4,5-tetrazine, a bright purple-colored compound. The radiation consists essentially of one or more wave lengths in the range of 1000 to 6000 angstrom units. The preferred radiation is ultraviolet having a wave length in the range of 1000 or 2000 to 3850 angstrom units. In terms of light flux, this may vary from $10^{19}$ to $10^{22}$ photons absorbed per hour per sq. cm. of mixture undergoing photolysis. Any suitable source of radiation may be used, such as a Hanovia photochemical lamp, Type A, of 550 watts, or a Delmar Scientific Laboratories lamp, model DM–580, and the like. If desired, the lamp may be suitably equipped to isolate a desired wave length. Flourescent lamps are useful, as well as sunlight and a laser beam. Flash photolysis may be used. Distances between the light source and the reaction mixture are conventional, e.g., 1 to 10 or more inches; and preferably air is excluded from the mixture. The latter, of course, is held in a vessel that will transmit the desired radiation. During application of the radiation, it is preferred to maintain the mixture at or near room temperature, and if necessary, cooling is used. The time of exposure is variable, but generally may extend from one or more hours to one or more days. Besides nitrogen, substantially the only other product of the photolysis is the dimer. As one mole of nitrogen is evolved per mole of tetrazole photolyzed, the amount of nitrogen may be used to determine the extent of completion of the reaction.

Sutiable inert solvents for carrying out the dimerization include ethers, saturated hydrocarbons, and aromatic hydrocarbons. Also such compounds as p-dioxane, methyl acetate, ethyl acetate, tetrahydrofuran, etc. Although some of the latter compounds, such as the aromatics, are unsaturated, their multiple bonds are not reactive in the environment, i.e., they do not take part in the described addition reaction.

Where the solvent for the tetrazole is reactive, as is the case with unsaturated non-aromatics, i.e., compounds having a multiple bond that is reactive in the environment, an addition reaction is possible between the intermediate and the solvent. For example, using an olefin,

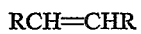

as solvent, the following equation may be written involving the intermediate (II) of Equation I:

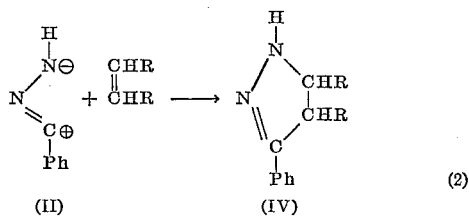

The intermediate adds across the double bond of the olefin, forming a ring compound (IV) (3-phenyl-delta$^2$-pyrazoline, if R is H). The radicals R of the olefin may be hydrogen, alkyl, aryl, alkaryl, aralkyl, etc. The olefin may be said to trap the intermediate, being thus designatable as a trapping agent. The olefin may be a linear one, or cyclic, or polycyclic, and may have one, two, or more double bonds.

A large number of reactive solvents for the tetrazole compound are available, all of which are characterized by having at least one reactive multiple bond connected to a carbon atom. They are chosen from non-aromatic compounds, including aliphatic, alicyclic, or heterocyclic compounds. As indicated, aromatics are considered to have double bonds that are non-reactive in the environment; however, aromatics having an unsaturated side chain may be useful, and in this case the compound is considered to fall in one of the above-mentioned groups. The useful compounds include those having carbon-to-carbon unsaturation, such as olefins RCH=CHR, actaylenes RC≡CR, allenes RCH=C=CHR, conjugated dienes RCH=CH—CH=CH$_2$, ketenes RCH=O=O, unsaturated esters RCH=CH—COOR and diesters, and vinyl derivatives like vinyl ethers RCH=CHOR, and vinyl amides RCH=C—N(R)COR; those having carbon-to-nitrogen unsaturation, such as nitriles RC≡N, azomethines

isocyanates RN=O=O, isothiocyanates RN=C=S, and enamines RCH=NR$_2$; those having carbon-to-oxygen unsaturation, such as aldehydes RCH=O, ketones R$_2$C=O, and the ketenes, esters, vinyl amides and isocyanates already noted; and those having carbon-to-sulfur unsaturation, such as thioketones RC(R)=S and the isothiocyanates noted. It will be understood that R in the foregoing formulas may be hydrogen, alkyl, aryl, alkaryl, and aralkyl.

The photolysis products of these reactive solvents may be indicated briefly. Thus, delta$^2$-pyrazolines, illustrated in Equation (2), are obtainable from olefins, conjugated dienes, allenes, unsaturated esters, enamies, vinyl ethers, and vinyl amides; more particularly, conjugated dienes lead to 5-vinyl-delta$^2$-pyrazolines, allenes to 5-methylene-delta$^2$-pyrazolines, unsaturated esters to 5-carboalkoxy-delta$^2$-pyrazolines, unsaturated to diesters to 4,5-dicarboalkoxy-delta$^2$-pyrazolines, enamines to 5-amino-delta$^2$-pyrazolines, vinyl ethers (where 2 is alkyl) to 5-alkoxy-delta$^2$-pyrazolines, and vinyl amides to 5-acylamino-delta$^2$-pyrazolines. Acetylenes give pyrazoles

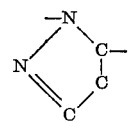

aldehydes and ketones give delta$^2$-1,2,4-oxadiazolines

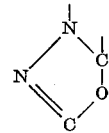

thioketones give delta$^2$-1,2,4-thiadiazolines.

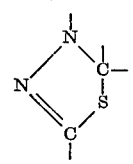

nitriles give triazoles,

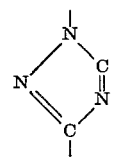

azomethines give triazolines

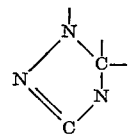

isocyanates may give triazolin-4-ones

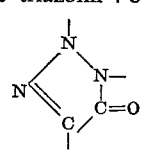

and isothiocyanates may give triazolin-4-thiones

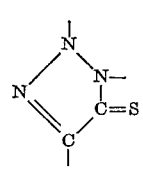

The reactive compound or trapping agent need not necessarily be a solvent for the tetrazole, as it is possible to dissolve the tetrazole in an inert or non-reactive solvent in which the reactive trapping agent is also soluble. One of the described inert solvents may be selected for this purpose, only a simple test being necessary to determine which solvent is suitable.

As indicated, the photolysis is preferably done at room temperature, although higher and lower temperatures, ranging from about 0 to 80 or 90° C., are also suitable.

At these temperatures the reaction mixture is in the liquid phase, as is preferred, Separation of the desired reaction product may be accomplished by any suitable conventional technique. Yields of desired product, based on the starting tetrazole, may range up to 80%, or even up to 95%, mole basis.

The products obtained by photolyzing an aryltetrazole in the presence of an unsaturated ester are of use as light stabilizers for hydrocarbon fractions subject to darkening on exposure to light. These products, which may be used in conventional stabilizing amounts, are carboalkoxy aryl-delta$^2$-pyrazolines, where the aryl group or groups may be phenyl, tolyl, xylyl, naphthyl, and the like, the alkoxy group may be methoxy, ethoxy, propoxy, butoxy, etc., and where one or more carboalkoxy groups may be present. The hydrocarbon fraction is preferably a higher boiling material, such as one in the lubricating oil range, containing partially hydrogenated polynuclear aromatics, which are thought to be responsible for the light instability of the fraction. Other light-unstable fractions may also be benefitted, as well as other light-unstable materials whether containing hydrocarbons or not. the stabilizer-containing fraction may exhibit two or more times the light resistance as the same fraction without stabilizer.

Aryl-delta$^2$-pyrazolines, and derivatives thereof, are also of value as optical brighteners, and may be added in small amounts to materials, such as textile fibers and fabrics, particularly synthetics, which normally are not pure white, appearing more or less yellowish, but which, with addition of the brightener, acquire increased whiteness. The aryl-delta$^2$-pyrazolines fluoresce in the visible blue region, a fact believed to account for their brightening power. Other materials that may be brightened are various chemical coatings, plastics, paper, and soap. In the case of plastics, it is contemplated that the brightening agent be added to the reaction mixture for producing the polymer product in order to effect a chemical bonding of the agent to the polymer chains. An ester derivative like carboalkoxy aryl-detla$^2$-pyrazoline may also be of use for maknig resins of the polyester type, as by reacting the derivative with a glycol like ethylene glycol; the derivative would thus replace, or substitute for, dibasic acids of the type of terephthalic acid.

An increased variety of products is possible by first converting the starting tetrazole to a tetrazolide and then subjecting the resulting reaction mixture to photolysis. For example, if 5-phenyltetrazole is the starting tetrazole, it is dissolved in methanol and treated with sodium methoxide, thus forming sodium tetrazolide:

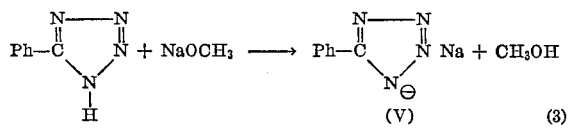

(V)   (3)

Upon irradiation of the reaction mixture, an ether is formed, according to the following mechanistic equation:

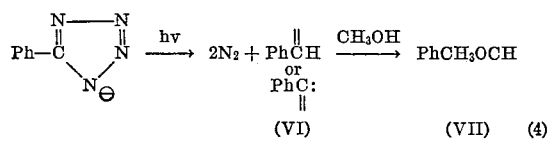

(VI)   (VII)   (4)

The formula of intermediate (VI) is speculative, but as shown in Example 6, the ether product (VII) is identifiable. The structure of the ether depends on the alcohol used as solvent and on the group in the 5-position of the starting tetrazole, and as these variables are each of considerable scope, it may be seen that a wide variety of ethers may be synthesized. Thus, the group in the 5-position may be any of those already indicated; and any alcohol may be used that is capable of dissolving the tetrazole, including aliphatic, aromatic, and cycloaliphatic alcohols. It will be understood that treatment of the starting tetrazole may utilize various alkali and alkaline earth metal alkoxides besides sodium methoxide; the latter, however, is a very useful strong base. It is also possible to isolate the tetrazolide from the reaction mixture and irradiate it separately.

Furthermore, by using other reactive solvents instead of alcohols, an even greater diversity of products is possible. Thus, amines may be used as the reactive solvent, including alkyl, cycloalkyl, aryl, and heterocyclic amines. Olefins, such as those described, or other useful solvents, and aliphatic and cyclic thiols.

The invention may be illustrated by the following examples.

Example 1

Illustrating the photolysis of 5-phenylterazole to form the dimer, 0.6 g. of the tetrazole was dissolved in 50 ml. of tetrahydrofuran (THF) and the solution placed in a quartz tube. The THF functioned as a non-reactive solvent. The tube was irradiated with ultraviolet radiation, using a Hanovia 450-watt medium pressure mercury vapor lamp, at 25° C. The photolysis was followed by determining the amount of nitrogen evolved, one mole of nitrogen corresponding to one mole of tetrazole photolyzed. After 30 hours, the recation was 75% complete, and after 72 hours, it was 99.8% complete. A clear yellow solution formed which was evaporated under reduced pressure to remove the solvent, giving 0.55 g. of a yellow solid having no sharp melting point. This product was dissolved in ethanol, and air was bubbled for 3 hours through the solution, which became a deep red. After evaporation of the solvent, 0.5 g. of a red-blue solid was obtained; on recrystallization from ethanol, crystals melting at about 185° C. resulted, comprising 3,6-diphenyl-1,2,4,5-tetrazine.

Example 2

Photolysis of a tetrazole with an olefin was carried out by mixing 0.48 g. of 2,5-diphenyltetrazole with 40 ml. of alphadicyclopentadiene, a reactive solvent, and irradiating the mixture in a quartz tube for 17 hours with the lamp described in the preceding example. The resulting solution was evaporated by placing it on a hot water bath and reducing the pressure to 1 mm. by means of a vacuum pump. A gummy yellow solid was obtained which was recrystallized from ethanol, giving 0.34 g. of a crystalline solid, m. 171–174° C. The product was thought to be 1,3-diphenyl - 4,8 - methano - 3a.4.4a.7a.8.8a - hexahydro-indeno-(5,6-c) pyrazole:

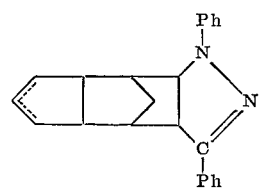

The compound is believed to have a double bond at one of the positions indicated by the dashed lines.

Example 3

Photolysis of a tetrazole in the presence of an unsaturated ester was performed by dissolving 1 g. 2,5-diphenyltetrazole and 8 g. dimethyl fumarate in a non-reactive solvent comprising 30 ml. tetrahydrofuran and 130 ml. ethyl acetate. The mixture was placed in a quartz tube and then irradiated with light of 254 millimicron wave length in a Rayonet chamber reactor for 35 hours at a maximum temperature of about 35° C. This reactor, which is made by Southern New England Ultraviolet Co., Middletown, Conn., contained 16 low pressure mercury lamps 84% of whose emission is at 254 millimicrons. The irradiated product was a yellow solution which after evaporation of the solvent gave 2.2 g. of a crude solid. The latter was recrystallized twice from methanol, giving yellow crystals (plates), M. 151–152.5° C. Its analysis was determined to be $C_{19}H_{18}N_2O_4$, and it was identified as trans - 4,5 - dicarbomethoxy - 1,3 - diphenyl - delta$^2$-pyrazoline.

Example 4

The photolysis of the preceding example was repeated, except that the unsaturated ester was diethyl fumarate, in an amount of 227 g., and the tetrazole was used in an amount of 29.4 g. No solvent was used as the ester was in liquid state and able to dissolve the tetrazole. Irradiation in the Rayonet chamber was carried out for 3 days, leading to a yellow liquid product. After evaporation of excess fumarate, an oily product resulted which after two recrystallizations from methanol led to a solid, M. 72.5–73.5° C. The yield was 34.5 g. It was determined to be trans-4,5-dicarboethoxy-1,3-diphenyl-delta$^2$-pyrazoline.

Example 5

2,55-diphenyltetrazole in an amount of 1.0 g. was photolyzed with 30 ml. dimethyl maleate in the Rayonet reactor. The inert solvent comprised 5 ml. n-hexane and 20 ml. tetrahydrofuran. The reaction was complete after 15 hours, but irradiation was performed for a total of 22.5 hours. The resulting clear viscous yellow solution was evaporated to remove solvent, giving 2.0 g. of a product. After several recrystallizations from methanol, a crystalline product was obtained, M. 151–152.5° C. It was the same product obtained in Example 3.

Example 6

5-phenyltetrazole was converted to the tetrazolide and irradiated. The tetrazole in an amount of 0.6 g. was dissolved in 50 ml. methanol containing 3 g. sodium methoxide; the tetrazolide (sodium 5-phenyltetrazolide) formed in this step and dissolved in the methanol. The mixture was placed in a quartz tube and irradiated for 69 hours, using the lamp described in Example 1. The solution was then evaporated, giving 3 g. of an amorphous solid. To it were added 15 ml. water, and the resulting suspension was extracted 3 times with 10-ml. portions of ether. The ether extracts were combined and dried over anhydrous $MgSO_4$, then filtered, and the ether evaporated off. About 0.1 g. of a pale yellow oil was obtained which was identified by vapor phase chromatographic analysis as benzyl ether.

On repeating the foregoing, the tetrazolide, a thermally stable compound, was isolated before subjecting it to irradiation, and the latter step was carried out as described. The same ether product was obtained.

Example 7

The photolysis product of Example 3 was tested as a light stabilizer in a lubricant produced by hydrocracking and known to contain partially hydrogenated polynuclear aromatics having three or more aromatic rings. The amount of such product used was 0.1% by weight, and at the same time another portion of the same lubricant was tested but without stabilizer. After exposure of both lubricants to light and air under the same conditions, it was found that in the case of the stabilized lubricant the time required for darkening was extended by 2 to 3 times by comparison with the unstabilized lubricant. In a continuation of these tests, some 120 additives were tried for light-stabilizing properties but without effect.

It will be understood that the invention is capable of obvious variations without departing from its scope.

In the light of the foregoing description, the following is claimed.

1. Method of preparing organic compounds photochemically comprising exposing a tetrazole to electromagnetic radiation of a wave length of 1000 to 6000 angstrom units for a time sufficient to photolyze said tetrazole to produce nitrogen gas and to form a reactive 1,3-dipolar intermediate, and continuing said photolysis to form a ring compound of said intermediate.

2. Method of claim 1 wherein said further reaction step comprises dimerizing said intermediate during said photolysis.

3. Method of claim 1 wherein said further reaction step comprises an addition reaction, carried out during said photolysis, in the presence of a non-aromatic compound having at least one multiple bond connected to a carbon atom, whereby said intermediate adds across said multiple bond of said compound.

4. Method of claim 3 wherein said multiple bond is a triple bond and the addition product is a pyrazole derivative.

5. Method of claim 3 wherein said non-aromatic compound has a C to O multiple bond and the addition product is an oxadiazole derivative.

6. Method of claim 3 wherein said non-aromatic compound has a C to S multiple bond and the addition product is a thiadiazole derivative.

7. Method of claim 3 wherein said unsaturated non-aromatic compound is selected from olefins, conjugated dienes, allenes, ketenes, acetylenes, aldehydes, ketones, thioketones, nitriles, azomethines, isocyanates, isothiocyanates, enamines, vinyl ethers, vinyl esters, and vinyl amides.

8. Method of claim 3 wherein said tetrazole substituent is selected from alkyl, aryl, amino, acyl, alkoxy, amido, alkylthio, alkylsulphonyl, cycloalkyl, aryloxy, hydroxy, halogen, cyanide, nitrate, sulfide, sulfonyl, and mercapto.

9. Method of claim 3 wherein said non-aromatic compound has a C to N multiple bond and the addition product is a triazole derivative.

10. Method of claim 9 wherein said compound is a nitrile.

11. Method of claim 3 wherein said non-aromatic compound has a carbon-to-carbon multiple bond.

12. Method of claim 11 wherein said multiple bond is a double bond and the addition product is a delta$^2$-pyrazoline.

13. Method of claim 12 wherein said non-aromatic compound is an olefin.

14. Method of claim 12 wherein said non-aromatic compound is an ester of a dibasic acid.

15. Method of preparing an organyl derivative from an organyl-substituted tetrazole comprising converting said tetrazole to a tetrazolide in the presence of a reactive solvent for the latter, subjecting the resulting reaction mixture to electromagnetic radiation of a wave length of 1000 to 6000 angstrom units for a time sufficient to photolyze the tetrazolide, and recovering from the resulting reaction mixture a product incorporating said organyl group and a moiety of said solvent.

16. Method of claim 15 wherein said solvent is an alcohol.

17. Method of claim 15 wherein said solvent is an amine.

18. Method of claim 15 wherein said solvent is an olefin.

19. Method of claim 15 wherein said organyl group is a hydrocarbyl group and said solvent is an alcohol.

20. Method of claim 19 wherein said hydrocarbyl group is an aryl group and said solvent is an alcohol.

21. Method of claim 15 wherein said tetrazolide is isolated from the reaction mixture before irradiation of the same.

References Cited

UNITED STATES PATENTS 2,738,429  3/1956  Goldblith _____ 204—158

HOWARD S. WILLIAMS, Primary Examiner

UNITED STATES PATENT OFFICE
CERTIFICATE OF CORRECTION

Patent No. 3,528,897                    Dated September 15, 1970

Inventor(s) Peter Scheiner

It is certified that error appears in the above-identified patent and that said Letters Patent are hereby corrected as shown below:

Column 2, line 47, intermediate (II) of formula I should be read, in part,

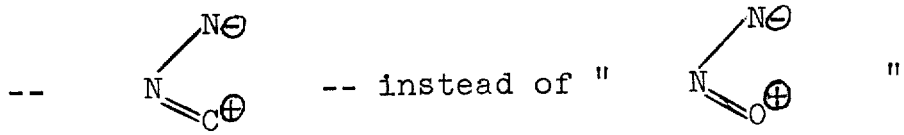

Column 3, lines 57-58, "actaylenes" should be read --acetylenes--.

Column 3, line 67, "isocyanates RN═O═O" should be read --isocyanates RN═C═O--.

Column 4, line 4, "enamies" should be read --enamines--.

Column 4, line 9, "unsaturated to diesters" should be read --unsaturated diesters--.

Column 4, line 10, "(where 2 is alkyl)" should be read --(where R is alkyl)--.

Column 5, line 2, "preferred," should read --preferred.--.

Column 5, line 22, "the" should be read --The--.

(continued)

UNITED STATES PATENT OFFICE
CERTIFICATE OF CORRECTION

Patent No. 3,528,897     Dated September 15, 1970

Inventor(s) Peter Scheiner     PAGE - 2

It is certified that error appears in the above-identified patent and that said Letters Patent are hereby corrected as shown below:

(continued)

Column 5, line 60, Formula (4) intermediate (VII) should be read, in part, --PhCH$_2$OCH$_3$-- instead of "PhCH$_3$OCH".

Column 6, line 10, "or" should be read --are--.

Column 7, lines 44-45, "benzyl ether" should be read --benzyl methyl ether--.

Signed and sealed this 8th day of December 1970.

(SEAL)
Attest:

EDWARD M. FLETCHER, JR.
Attesting Officer

WILLIAM E. SCHUYLER, JR.
Commissioner of Patents